United States Patent [19]

Long

[11] 4,351,437

[45] Sep. 28, 1982

[54] METHOD AND APPARATUS FOR EXAMINING OBJECTS

[75] Inventor: Peter G. Long, Colchester, England

[73] Assignee: Lockwood Graders (UK) Limited, Essex, England

[21] Appl. No.: 141,763

[22] Filed: Apr. 21, 1980

[30] Foreign Application Priority Data

Jan. 18, 1980 [GB] United Kingdom ............... 8001807

[51] Int. Cl.³ .......................... B07C 5/02; B07C 5/00
[52] U.S. Cl. ................................. 209/545; 209/557; 209/585; 209/586; 209/587; 209/936; 209/939; 250/223 R; 250/560; 356/386
[58] Field of Search ............... 209/576, 577, 586, 587, 209/585, 939, 638, 657, 932, 559, 563, 564, 545, 936, 557; 250/223 R, 560; 356/383, 384, 385, 386, 387

[56] References Cited

U.S. PATENT DOCUMENTS

| 3,472,375 | 10/1969 | Mathews | 209/932 X |
| 3,943,361 | 3/1976 | Miller | 250/560 X |
| 4,152,767 | 5/1979 | Laliotis | 356/386 X |
| 4,168,005 | 9/1979 | Sandbank | 209/638 X |
| 4,179,707 | 12/1979 | Sjödin | 250/560 X |

FOREIGN PATENT DOCUMENTS

| 54-145164 | 11/1979 | Japan | 209/939 |
| 941124 | 11/1963 | United Kingdom. | |
| 1330132 | 9/1973 | United Kingdom. | |
| 1393061 | 5/1975 | United Kingdom. | |
| 1449755 | 9/1976 | United Kingdom. | |
| 2022817 | 12/1979 | United Kingdom. | |

Primary Examiner—Allen N. Knowles
Attorney, Agent, or Firm—Cushman, Darby & Cushman

[57] ABSTRACT

Potatoes carried on a roller table conveyor are presented in transverse rows at an inspection area illuminated by a lamp from a first direction and observed by a line imaging camera along a second direction arranged by a mirror to be approximately at right angles to the first direction. The camera scans repeatedly across each row and provides an output detection signal representing the reflected radiation. The camera observes a sharply illuminated boundary of the potatoes against a dark background a micro-computer processes the detection signal to provide an information signal representative of the length of a potato along the direction of its row. Size grading, for example, may be effected by directing potatoes along different routes by deflecting fingers controlled in dependence upon the information signal. An operator may observe potatoes in the inspection area by means of a television camera and monitor, and may indicate by a lightpen a potato to be rejected by the subsequent deflecting fingers. The deflecting fingers are actuated in dependence upon both an identifying signal and identifying the reject potato and an information signal representative of the length of the potato along the length of the row.

43 Claims, 8 Drawing Figures

---- Light paths

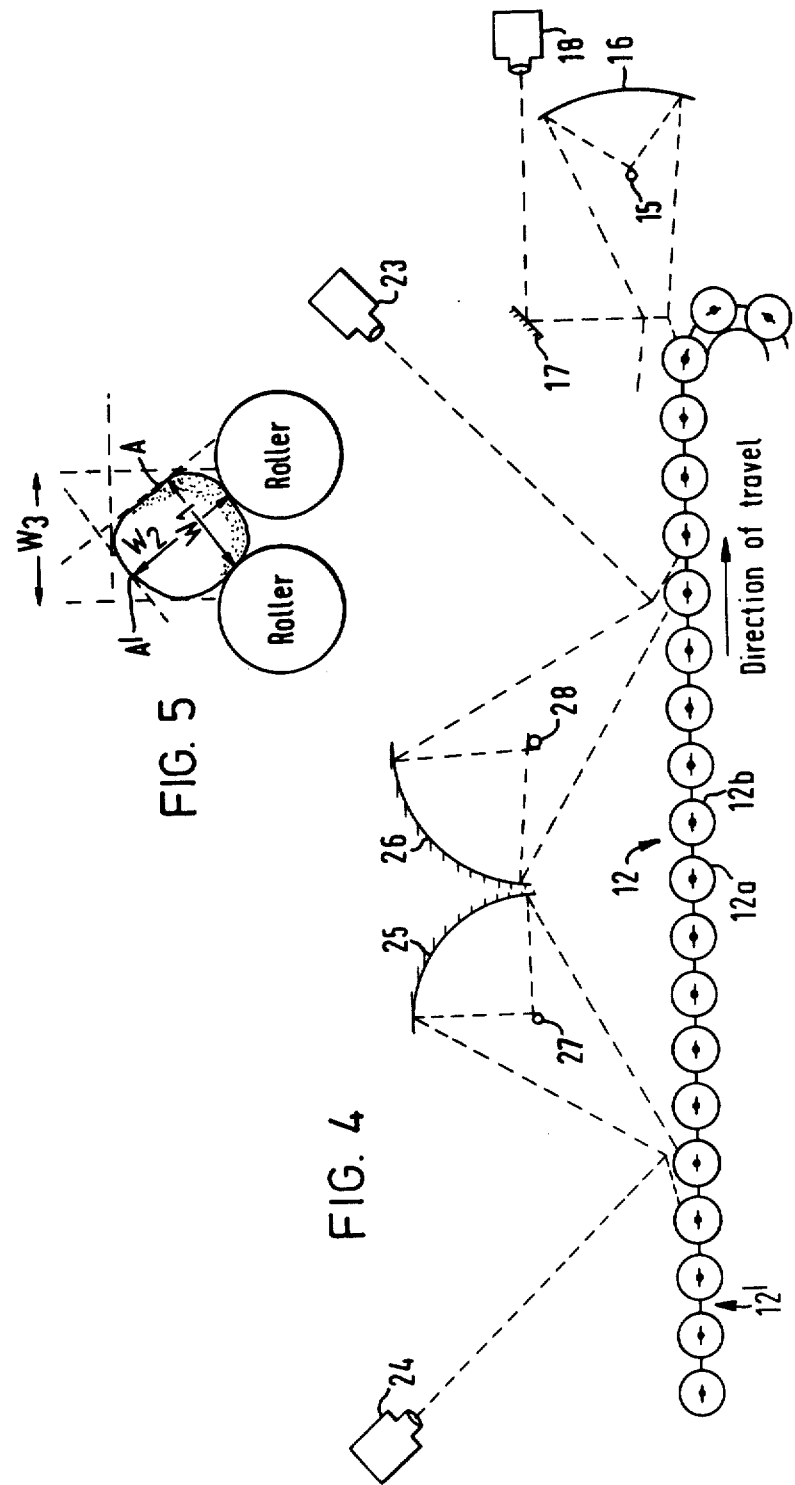

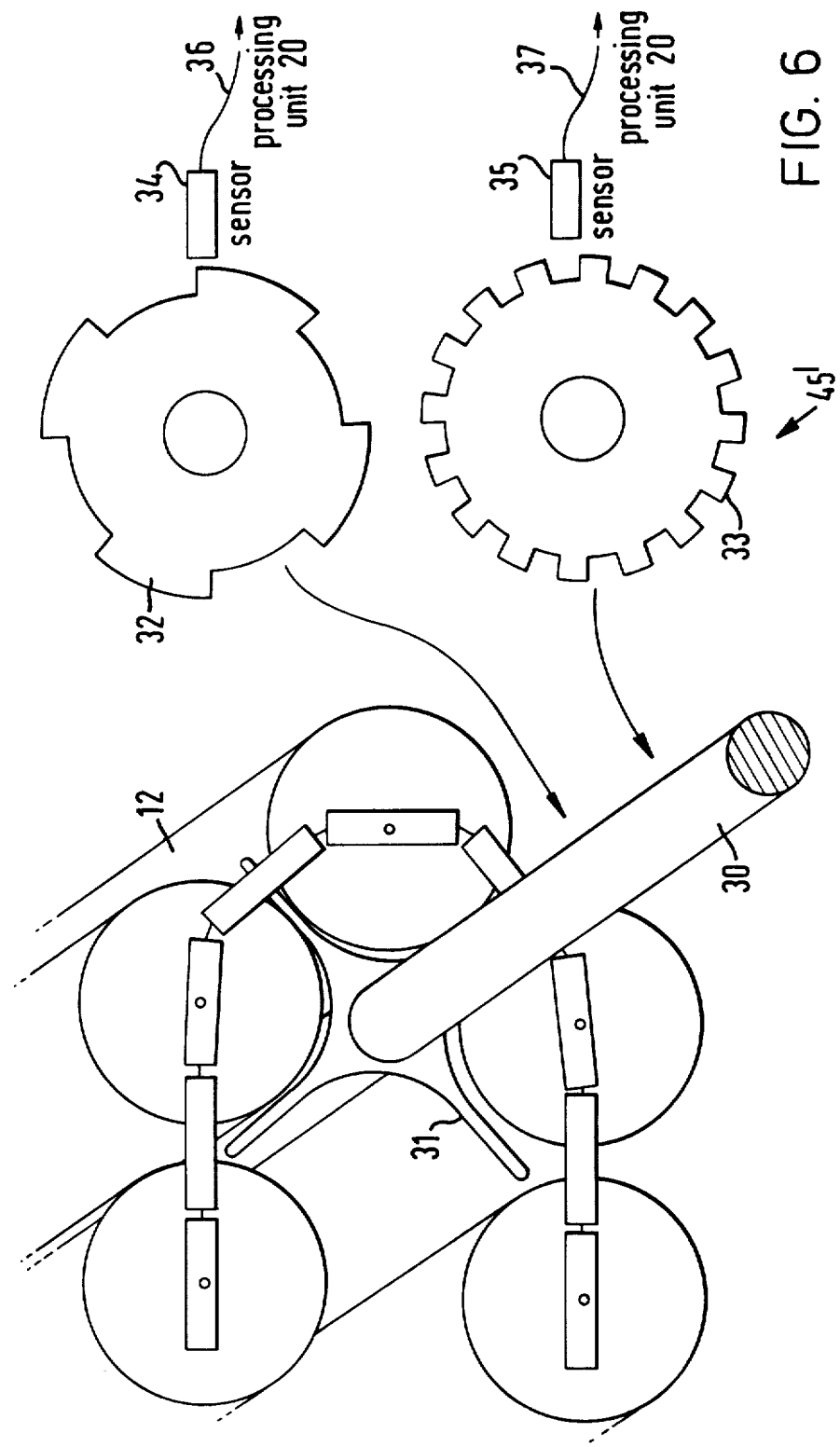

METHOD AND APPARATUS FOR EXAMINING OBJECTS

The present invention relates to a method of and apparatus for examining objects and is particularly but not exclusively concerned with sizing and/or sorting of root vegetables, for example potatoes.

It is now common practice in potato harvesting to employ automatic means to grade potatoes by size. Generally, the methods employed or proposed to date have relied upon purely mechanical separation of the potatoes by size, using orifices of progressively larger size through which appropriately sized potatoes pass. Examples of mechanical sizers in use in the potato industry are shaker riddles, spool sizers and screen sizers. Unfortunately, the mechanical sizing of potatoes necessarily causes damage, especially bruising, to a proportion of the crop. Methods of electrically and/or optically sizing potatoes have been proposed in an attempt to reduce the mechanical handling of the crop and to improve the resolution and adaptability of the grading procedure. Such non-mechanical methods have not been entirely satisfactory to date in terms of performance and/or expense and have not displaced the preference for mechanical sizing in potato handling. In this connection, it will be appreciated that a major problem in applying electrical and/or optical methods of measurement to potato sizing is the dirty conditions encountered because of the presence of soil with the potatoes.

It is an object of this invention to provide a reliable, adaptable and relatively inexpensive electro-optical method of and apparatus for, sizing objects which requires limited mechanical handling and which can be readily adapted to operate in difficult conditions such as the presence of soil. Although the invention is particularly applicable for use with potatoes, it will be appreciated from the following description that the method and apparatus of the invention can also be used to examine, size and/or sort other objects, especially, but not exclusively, other root crops.

According to the present invention there is provided a method of examining an object comprising the steps of illuminating the object with electro magnetic radiation incident predominantly from a first direction, observing the object by a radiation detector along a second direction inclined to the first direction to detect radiation reflected by the object, the illuminating and/or detecting steps including a scanning operation across the object along a path transverse to the two said directions to provide from the detector a detection signal representing different reflected radiation from different regions along the path of scanning, producing relative movement between the object and the path of scanning along a direction transverse to the path of scanning and repeating the scanning operation to provide a series of scans across the object, and processing the detection signal to provide an information signal representative of a dimensional parameter of the object.

The term dimensional parameter includes a linear dimension, an area or a volume, and the information signal may be provided by processing the detection signal alone or by processing the detection signal in combination with other information, for example with information concerning the said relative movement between the object and the path of scanning.

In accordance with a particular application of the invention, there is provided a method of operating on an object comprising the steps of moving the object through an inspection station for examination of the object, examining the object as set out in the preceding paragraph, and operating upon the object subsequent to the examination of the object by action dependent upon the information signal.

There is also provided in accordance with the present invention a method of examining a plurality of objects comprising the steps of arranging the objects in a plurality of rows, illuminating the objects one row at a time with electro magnetic radiation incident predominantly from a first direction transverse to the row, observing the objects by a radiation detector along a second direction also transverse to the row and inclined to the first direction to detect radiation reflected by the objects, the illuminating and/or detecting steps including a scanning operation across the objects along the row to provide from the detector a detection signal representing different reflected radiation from different regions along the path of scanning, producing relative movement between the objects and the path of scanning along a direction transverse to the row and repeating the scanning operation to provide a series of scans across the objects, and processing the detection signal to provide an information signal representative of a dimensional parameter of the objects.

Where a plurality of objects are examined, there may be provided information signals representative of dimensional parameters of individual objects, or one or more information signals representative of a dimensional parameter of a plurality of objects, for example an average dimensional parameter or a sum of dimensional parameters of a number of objects.

According to the present invention in another aspect there is provided a method of operating on a plurality of objects comprising the steps of arranging the objects in a plurality of rows, moving the objects one row at a time through an inspection station by movement transverse to the row, illuminating the objects at the inspection station with electro magnetic radiation incident predominantly from a first direction transverse to the row, observing the objects by a radiation detector along a second direction also transverse to the row and inclined to the first direction to detect radiation reflected by the objects, the illuminating and/or detecting steps including a scanning operation across the objects along the row to provide from the detector a detection signal representing different reflected radiation from different regions along the path of scanning, repeating the scanning operation to provide a series of scans across the objects, processing the detection signal to provide an information signal representative of a dimensional parameter of the objects, and operating upon the objects by action dependent upon the information signal.

It is to be appreciated that the said action to the objects is not necessarily limited to action subsequent to the inspection station. The said action may affect objects which have not yet reached the inspection station, for example as by the action of speeding up or slowing down in response to the information signal a conveyor means for conveying the objects through the inspection station.

Also, the said action may be dependent upon the information signal alone, or may be dependent upon the information signal in combination with a signal relating to other information.

There is further provided according to the present invention apparatus for examining an object comprising means for illuminating the object with electro magnetic radiation incident predominantly from a first direction, a radiation detector for observing the object along a second direction inclined to the first direction to detect radiation reflected by the object, there being provided in association with either the illuminating means or the radiation detector, or with both, means for effecting a scanning operation across the objects along a path transverse to the two said directions to provide from the detector a detection signal representing different reflected radiation from different regions along the path of scanning, means for producing relative movement between the object and the path of scanning along a direction transverse to the path of scanning, the scanning means being arranged to repeat the scanning operation to provide a series of scans across the object, and means for processing the detection signal to provide an information signal representative of a dimensional parameter of the object.

In accordance with a particular application of the invention, there is provided apparatus for operating on an object comprising means for moving the object through an inspection station for examination of the object, means for examining the object as set out in the preceding paragraph, and means for operating upon the object subsequent to the examination of the object by action dependent upon the information signal.

There is yet further provided in accordance with the present invention apparatus for examining a plurality of objects comprising means for arranging the objects in a plurality of rows, means for illuminating the objects one row at a time with electro magnetic radiation incident predominantly from a first direction transverse to the row, a radiation detector for observing the objects along a second direction also transverse to the row and inclined to the first direction to detect radiation reflected by the objects, there being provided in association with either the illuminating means or the radiation detector, or with both, means for effecting a scanning operation across the objects along the row to provide from the detector a detection signal representing different reflected radiation from different regions along the path of scanning, means for producing relative movement between the objects and the path of scanning along a direction transverse to the row, the scanning means being arranged to repeat the scanning operation to provide a series of scans across the objects, and means for processing the detection signal to provide an information signal representative of a dimensional parameter of the objects.

According to the present invention in yet another aspect there is provided apparatus for operating on a plurality of objects comprising means for arranging the objects in a plurality of rows and for moving the objects one row at a time through an inspection station by movement transverse to the row, means for illuminating the objects at the inspection station with electro magnetic radiation incident predominantly from a first direction transverse to the row, a radiation detector for observing the objects along a second direction also transverse to the row and inclined to the first direction to detect radiation reflected by the objects, there being provided in accordance with either the illuminating means or the radiation detector, or with both, means for effecting a scanning operation across the objects along the row to provide from the detector a detection signal representing different reflected radiation from different regions along the path of scanning and for repeating the scanning operation to provide a series of scans across the objects, means for processing the detection signal to provide an information signal representative of a dimensional parameter of the objects, and means for operating upon the objects by action dependent upon the information signal.

In normal operation of the method, the steps will be applied to a plurality of objects, for example to effect sorting of the objects by directing different objects in different directions in dependence upon different information signals associated with the different objects. However in the next subsequent paragraphs outlining particular features of the invention, reference will be made to examination of, or operation on, a single object, for the sake of simplicity.

The said scanning operation may be carried out by scanning either the illumination of the object (for example by scanning a spot of light across the object) or by scanning the observation of the object (for example by observing the object with a scanning line-camera or a self-scanning photodiode array) or by a combination of these scanning steps. However it is preferred that the object shall be illuminated by fixed illumination, and that the observation of the object shall be scanned.

Preferably, in the repeated scanning of the objects, each scan of the object is advanced spatially relative to the object in a direction substantially at right angles to the direction of scan. Preferably the advance of the scans is arranged by moving the object through an inspection station so that the object passes through a fixed scan-line along which the scanning takes place.

Preferably the directions of illumination and observation, and the general arrangement, are such that there is observed by the detector an illuminated surface of the object having a boundary presented against a background which is dark relative to the illuminated surface. Preferably the said processing step includes deriving a signal representative of the said illuminated boundary of the object, for example by differentiating a signal representing intensity of reflected radiation.

Preferably the object is illuminated in such a manner that the said illuminated boundary extends around a significant proportion of the object, preferably approximately half of the object, and in scanning across the object the radiation detector observes the illuminated boundary on two generally opposed sides of the object. In such a case, where the object is scanned repeatedly, and the object is advanced relative to the scan line, it is preferred that the rate of scanning and general arrangement is such that the radiation detector obtains information from one scan in which the boundary is detected substantially at grazing incidence, and at least one scan in which the illuminated boundary is detected twice. The processing step may include deriving from repeated scanning of the said illuminated boundary information as to the maximum separation of the detected illuminated boundary on the opposed sides of the object, to give information as to the length of the object along the line of scan. The processing step may alternatively or in addition include deriving from repeated scanning of the object information as to the separation between a point at which the radiation detector detects an illuminated boundary substantially at grazing incidence, and an approximate centre line of the object, to give information as to approximately half the width of the object transverse to the line scan. The approximate centre line of the object may be located either by reference to the means for forming the objects into rows (for example on a roller table by producing a position signal related to the position of the centre line between two rollers) or by deriving from the detection signal from the scanning operation information as to a scan line in which the detector detects the illuminated boundary twice (once on each of two opposed sides of the object) with maximum separation between the opposed sides of the illuminated boundary.

The said processing step may include deriving other information signals giving information as to the position of objects detected, the number of objects detected, and other parameters.

Preferably the directions of illumination and observation are inclined to each other at an angle in the range 45° to 135°, more preferably in the range 70° to 110°, and most preferably at an angle of approximately 80°.

Preferably the said scanning operation is carried out along a direction substantially at right angles to a plane containing said first and second directions.

Preferably the method of the invention includes the step of arranging a plurality of objects in parallel rows and moving one row at a time into an inspection station in a direction substantially perpendicular to the direction of the row, the said scanning operation being carried out by scanning the objects along the direction of the row of objects.

The various preferred features of the invention which have been set out in accordance with the method of the invention are also provided in accordance with the apparatus of the invention.

As has been mentioned, it is preferred to carry out the invention by setting up a series of rows of objects to be advanced towards an inspection station one row behind the other, each row being scanned in its turn. The method so defined can conveniently be carried out using a roller table which functions to set up a row of objects between each successive pair of rollers. Such a roller table may take the form of a conveyor belt made up of a series of rollers which extends transversely to the direction of movement of the conveyor. Conveniently the said inspection station is located at the delivery end of the roller table so that each row of objects is presented to the inspection station in turn immediately prior to being delivered from the end of the roller table.

The information signal from the processing means may be supplied as a control signal to a deflector means in order that said deflector means can selectively deflect objects as required. Usually the deflector means will be located downstream of the inspection area and in this case the signal will be processed in order to compensate for the time delay for the article to pass from its indicated transient position to the deflector means. This time delay will be linked to the speed of movement of the objects from the inspection area. The deflector means can comprise fingers for deflecting objects passing from the conveyor means. In the case of potatoes or other root vegetables or bulbs, the said fingers can be of the kind well known per se for separating said produce from soil and stones using, for example, X-ray beams.

Usually, the electromagnetic radiation will be light in the visible range (i.e. about $10^{12}$ kilohertz) but other electromagnetic frequencies can be employed, particularly about $10^{13}$ kilohertz (ultraviolet) or about $10^{11}$ kilohertz (near infra red). The radiation will be chosen having regard to the reflective properties of the article as well as, of course, the relative costs and safety of appropriate emitter and transducer means. The extent to which the object surface is required to be reflective to the incident radiation will be determined by the sensitivity of the detector to the reflected component. In general however, it will usually be sufficient that the surface merely diffusely deflect the incident radiation.

The means for illuminating the objects may comprise a linear source of electro magnetic radiation substantially parallel to and slightly longer than a row of objects presented to the inspection station. For example the illuminating means may comprise a fluorescent light tube, light from which is directed towards the inspection station by means of a part cylindrical mirror around the light tube. Alternatively it has been found that the objects may be satisfactorily illuminated by a plurality of conventional car fog lamps arranged to produce a bright slit of light.

It is a particular feature of the invention that, in some embodiments, the invention enables the maximum dimension of an object, for example an irregularly shaped object such as a potato, to be measured. Existing mechanical methods of sizing potatoes, like mesh sizing, measure only the minimum dimensions, since the potatoes in their movement through the mesh align themselves with their longest dimension perpendicular to the hole through which they pass. If the potatoes are passed through further machinery after sizing, such as a cup planter for seed potatoes, then if the maximum dimension of the potato is too large it is possible for the potato to jam in the planter thereby causing considerable problems. However, in utilising embodiments of the present invention, it is possible to prevent such an occurrence by measuring the maximum dimension of the potatoes, and comparing this against a predetermined size. Only potatoes below that size would then be permitted to travel through the subsequent machinery having a limited input dimension.

Thus in connection with this feature, there may be provided a method as set out in the preceding paragraphs, in which the said step of processing the detection signal comprises processing the signal to provide an information signal representative of a maximum linear dimension of an object. In one form of such a method, where the method is applied to a plurality of objects arranged in rows, the said step of arranging the objects in rows may include aligning the objects in the rows in such a manner that the longest dimension of each object is, in substantially all cases, aligned along the length of the row, and processing the said detection signal to derive an information signal representative of the length of an object along the direction of its row.

There is further provided in accordance with this feature of the invention, apparatus as set out in the previous paragraphs, in which the said processing means is arranged to provide an information signal representative of a maximum linear dimension of an object.

In one form of such apparatus, where the apparatus is adapted to operate on a plurality of objects arranged in rows, the means for arranging the objects in a plurality of rows may comprise means for aligning the objects in rows in such a manner that the longest dimension of each object is, in substantially all cases, aligned along the length of the row, and the said processing means is arranged to derive an information signal representative of the length of an object along the direction of its row.

In accordance with the method and apparatus aspects of the present invention, the invention finds particular application in the sorting of objects where it is required to select by inspection certain objects which are unacceptable, and then to reject these objects downstream of the inspection area.

In accordance with one aspect of the invention a method of sorting objects comprises arranging the objects on a conveyor means with a plurality of objects across the width of the conveyor means transverse to the direction of movement of the conveyor means, inspecting the objects and generating identifying signals identifying objects to be rejected, moving the objects to a plurality of routing devices positioned in an array transverse relative to the direction of travel of the conveyor means, operating selected groups of the routing devices to allow rejected objects to fall past the operated routing devices to a reject route of travel whilst acceptable objects are guided by unoperated routing devices to a non-reject route of travel, the method including the step of operating a group of routing devices in dependence upon both an identifying signal identifying an object to be rejected and an information signal representative of a dimensional parameter of the object, the dimensional parameter consisting of a linear dimension of the object transverse to the direction of travel of the conveyor means, and the information signal being provided by examining the object in accordance with the method of examining an object or objects as set out hereinbefore in preceding paragraphs.

In another aspect of the present invention, a method of sorting objects comprises conveying the objects on a conveyor means through an inspection area and subsequently allowing the objects to fall over an end of the conveyor means to routing means for routing objects selectively to different routes in dependence upon at least one sorting characteristic of the objects observed in the inspection area, the timing of actuation of the routing means being varied to compensate for different instants of toppling of objects over the edge of the conveyor means determined by differing sizes of the objects, the timing of the operation of the routing means being dependent inter alia upon an information signal representative of a dimensional parameter of the object, the dimensional parameter consisting of a linear dimension of the object taken along the direction of travel of the conveyor means, and the information signal being provided by examining the object in accordance with the method of examining an object or objects as set out hereinbefore.

There is further provided in accordance with the invention apparatus for sorting objects comprising conveyor means for conveying objects through an inspection area in an arrangement with a plurality of objects positioned across the width of the conveyor means transverse to the direction of movement of the conveyor means, selection means for generating identifying signals identifying objects to be rejected after selection of the objects by an operator inspecting the objects at the inspection area, a plurality of routing devices positioned downstream of the inspection area in an array transverse relative to the direction of travel of the conveyor means, and means for operating selected groups of the routing devices to allow rejected objects to fall past the operated routing devices to a reject route of travel whilst acceptable objects are guided by unoperated routing devices to a non-reject route of travel, the operating means being arranged to operate a group of routing devices in dependence upon both an identifying signal identifying an object to be rejected and an information signal representative of a dimensional parameter of the object, the dimensional parameter consisting of a linear dimension of the object transverse to the direction of travel of the conveyor means, and the information signal being provided by apparatus for examining the object as set out hereinbefore.

There is yet further provided in accordance with the invention, apparatus for sorting objects comprising conveyor means for conveying the objects through an inspection area and subsequently allowing the objects to fall over an end of the conveyor means to routing means for routing objects selectively to different routes, and means for actuating the routing means in dependence upon at least one sorting characteristic of the objects observed in the inspection area, the operating means including timing means for varying the timing of actuation of the routing means to compensate for different instants of toppling of objects over the edge of the conveyor means determined by differing lengths of objects, the timing means being connected to operate in dependence inter alia upon an information signal representative of a dimensional parameter of the object, the dimensional parameter consisting of a linear dimension of the object taken along the direction of travel of the conveyor means when the object is on the conveyor means and the information signal being provided by apparatus for examining the object in accordance with the apparatus as set out hereinbefore.

Embodiments of the invention will now be described by way of example with reference to the accompanying drawings in which:

FIG. 4 is a further diagrammatic representation in elevation of a modification of the apparatus shown in FIG. 1;

FIG. 5 is a explanatory diagram indicating various dimensions which may be measured approximately by apparatus embodying the invention;

Figure 1:
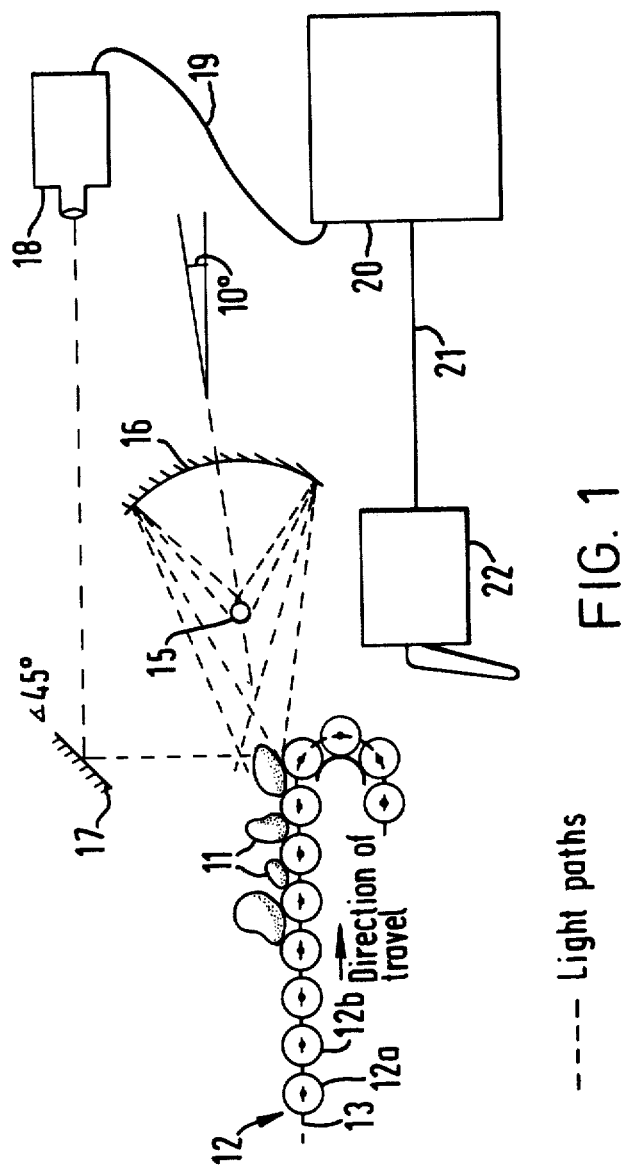
FIG. 1 is a diagrammatic representation in elevation of apparatus embodying the invention for examining objects, particularly potatoes, prior to sorting or other operations on the objects.
Figure 7:
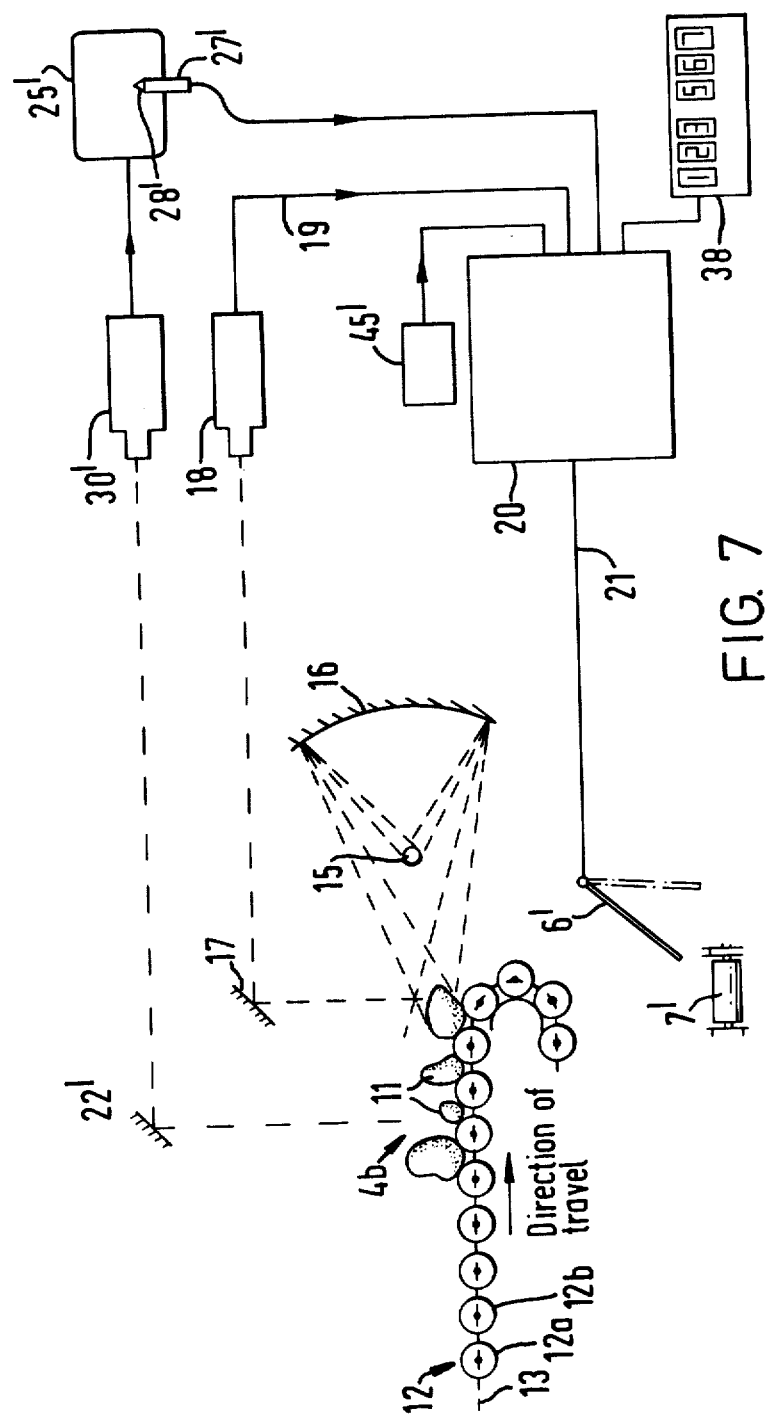
Figure 8:
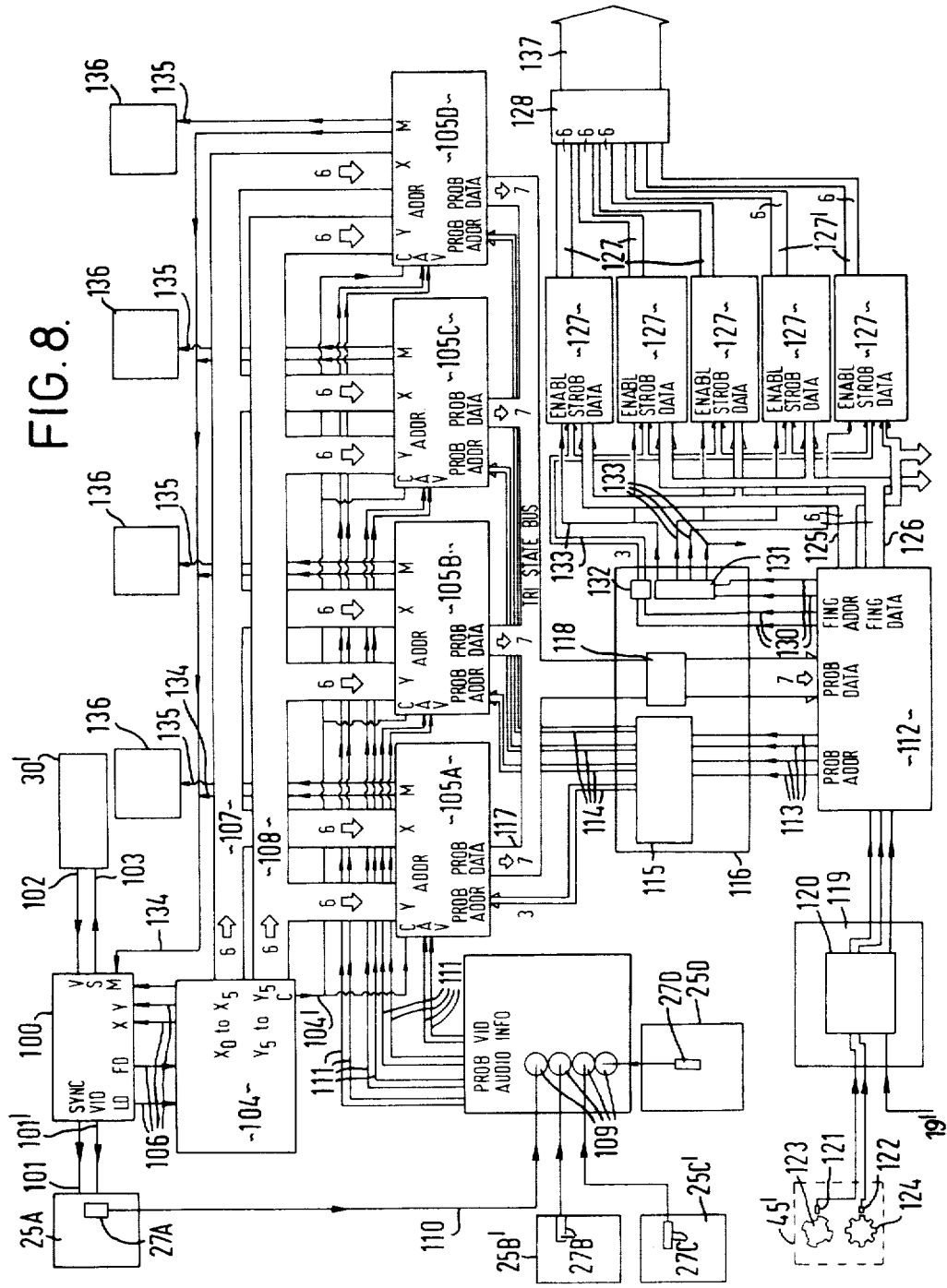

FIG. 6 is a diagrammatic representation of a conveyor sensor means for deriving timing signals related to the speed of a conveyor shown in FIGS. 1, 4 and 7, for use in a signal processing unit of the apparatus; and FIG. 7 is a block circuit diagram of a modified form of the apparatus of FIG. 1 adapted for sorting objects by selection means for identifying objects to be rejected; and FIG. 8 is a block circuit diagram showing how a micro computer may be used to carry out the functions of control means forming part of the apparatus shown in FIG. 7.

Figure 2:
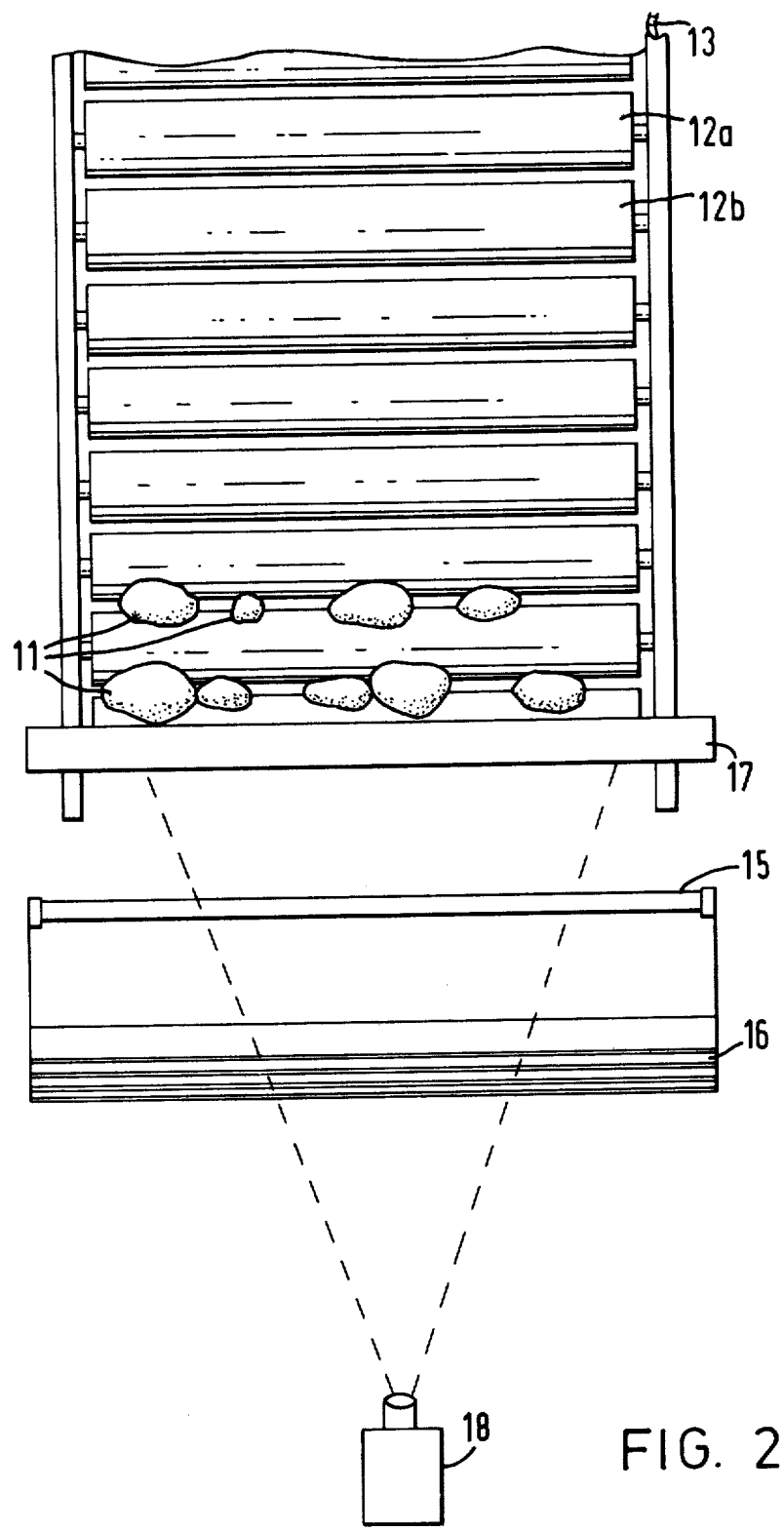
FIG. 2 is a plan view of the arrangement shown in FIG. 1.

Referring firstly to FIGS. 1 and 2, there is shown apparatus for presenting potatoes to an inspection station for deriving information concerning dimensional parameters of the potatoes. As will be explained, the information derived can be used for several different purposes, but in the present example use of the information will be described for sorting the potatoes according to size.

The potatoes 11 are carried on a roller table 12 consisting of a series of rollers 12a, 12b etc. The rollers are carried in known manner by a chain indicated diagrammatically by the broken line 13, and may be caused (over a distance prior to the inspection station) to rotate as they move along by passing them over a surface with which they engage and which helps to support them. The potatoes are fed onto the roller table in any known manner, for example from a hopper not shown in the drawings. The size of the rollers in cross section is chosen to be suitable for the crop to be handled, in this case potatoes, so that the largest objects to be inspected can be accommodated between a pair of rollers while the smallest sizes do not fall between them. The roller assembly, as is usual, is in the form of an endless loop only part of which is shown in the drawings. It advances from left to right as seen in the drawing and at the right-hand end turns downwardly and back upon itself. It is at this position that the inspection station is arranged.

The inspection system used takes the form of a linear light source 15 which may be for example a fluorescent tube which extends across the width of the roller table at a position slightly above the plane of the top surfaces of the rollers 12a etc. The length of this tubular lamp is preferably slightly longer than the width of the roller table so that a uniform illumination can be provided across the whole width of the table. The lamp 15 is backed by a cylindrical mirror 16 which directs the reflected light downwardly at a shallow angle to the plane of the roller table. An angle of about 10° is suitable. As will be seen from the drawing, the focussed light illuminates the front face of the advancing row of potatoes just as they reach the end of the table and are about to be tumbled off into the mechanical part of the sorting system which will be referred to later.

Vertically above the right-hand end of the roller table there is provided a 45° mirror 17 which extends across the whole width of the roller table. At the same level as the mirror 17 and some distance from it there is provided a line imaging camera 18 aligned so as to view the end of the roller table and therefore the potatoes in the foremost row as they advance towards the end of the table. The camera 18 is connected via a cable 19 to an electronic signal processing unit 20 arranged to process the signals received by the camera 18 and apply them to sorting means to carry out a sorting operation in a manner to be described hereinafter.

It will be readily understood that the illumination from lamp 15 and mirror 16 will provide a brilliant illumination of the front faces of the potatoes as they advance towards the inspection station. The camera 18 through the mirror 17 will see a plan view of the illuminated potatoes which will be, in the case of a substantially ellipsoidal potato, in the form of a crescent of brightly illuminated potato surface against a dark background. The direction of illumination is chosen so that the upper surface of the roller table is not illuminated, thus providing the dark background. The top surfaces of the potatoes are illuminated by grazing incidence light and the rear surfaces are, of course, dark. The line camera 18 sees during any one scan a linear picture corresponding to a narrow band stretching in a direction perpendicular to the direction of movement of the roller table. The observation is scanned across the front edge of the roller table so as to scan along a row of potatoes located on this front edge and illuminated in the manner above described.

Figure 3:
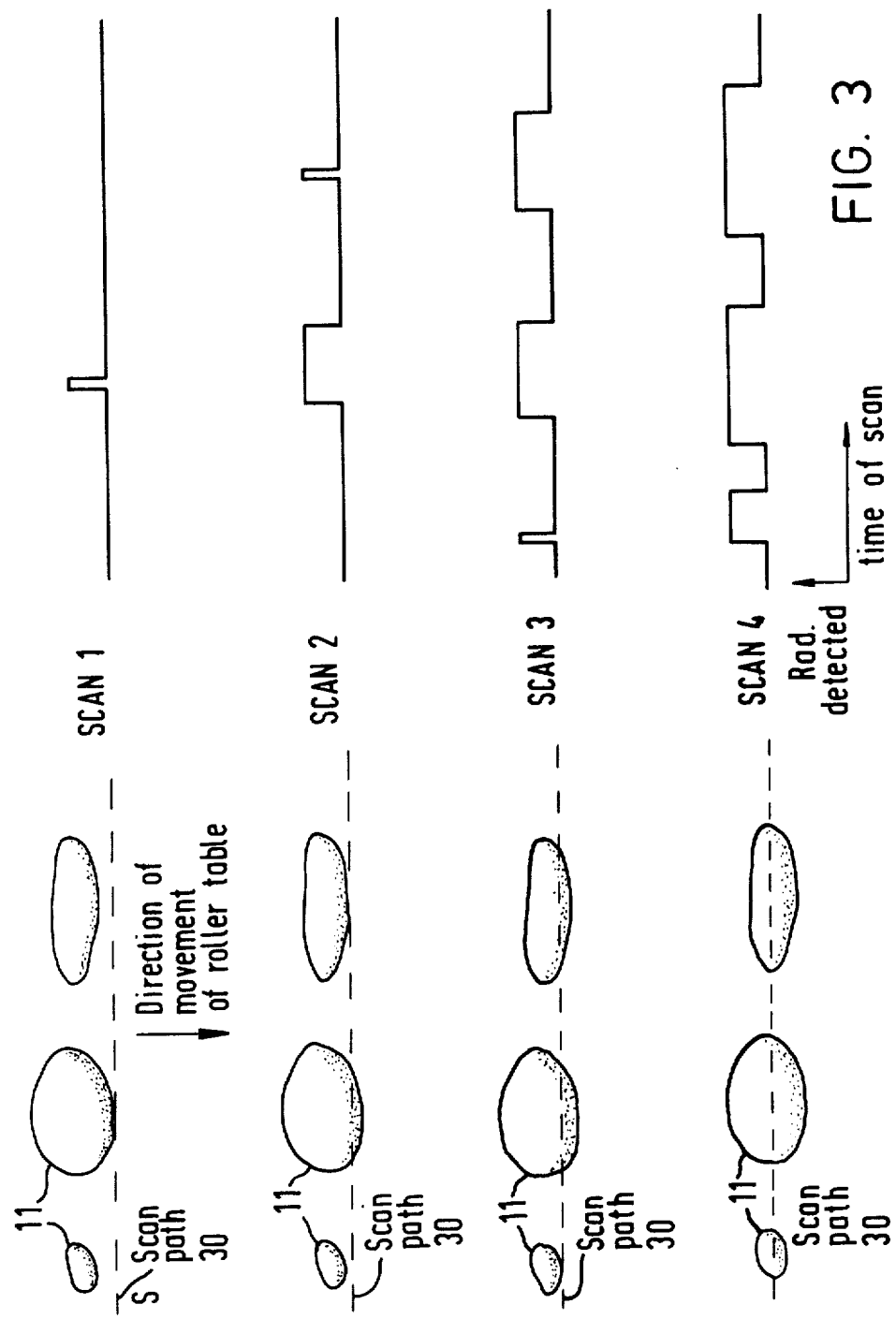
FIG. 3 is an explanatory diagram showing typical wave forms of detection signals for different scans across objects being examined.

In FIG. 3 there are shown three potatoes being advanced through a fixed scanning path 30 and four scans are shown across the potatoes with corresponding diagrammatic representations of the wave forms of the detection signals leaving the detector 18. It will be appreciated that the scans across the potatoes will in practice be much more frequent than shown. The scans 1 to 4 are merely representative scans.

Where the path of scan of the camera 18 crosses the illuminated front portion of a potato, the camera 18 will generally detect a black background, followed by a first sharp edge at the illuminated boundary of the potato at one side, followed by a distance of brightly illuminated potato, followed by a second sharp edge formed by the illuminated boundary of the potato on a second side, followed by a further dark area of unilluminated background. From this information the processing unit 20 can derive information as to the presence of the potato (the detection of the bright area), the approximate position of the potato (the centre say of the bright area) and the length of the band of potato being observed (the distance between the two illuminated boundary edges).

As a potato moves through the inspection station, the repeated scans of the camera 18 across the potato provide considerable further information which can be processed by the processing unit 20. For example where the scanning line of the camera 18 grazes the front of a potato, the two sharp edges of the illuminated potato boundary will either be extremely close together, or will coincide, and the processing unit 20 can be arranged to detect this condition and identify the leading edge of a potato. Correspondingly there will occur a scan of the camera 18 across a potato at which the separation between the detected illuminated boundary edges of the potato is a maximum separation. The processing unit 20 can be arranged to detect this condition of maximum separation between the illuminated boundary edges of the potato by comparing the separation of the boundary edges at successive scans of potato. When the condition of maximum separation of boundary edges of the potato has been detected, the processing unit 20 can extract two further pieces of information from this condition. Firstly the maximum separation of the illuminated boundry edges of the potato gives a measure of the approximate length of the potato along the direction of the rollers. (Usually the rollers arrange the longest dimension of a potato along the direction of the length of the rollers). Secondly the distance between the point on the potato at which the leading edge condition was detected, and the point on the potato at which the boundary edges have maximum separation, gives an approximate measure of half the width of the potato along a direction perpendicular to the rollers 12, i.e. along the direction of travel. (It is to be appreciated that in the arrangement described so far, the rear faces of the potatoes are not illuminated and therefore the images obtained after the illuminated boundary has passed are inaccurate and are discarded by the processing unit 20. Thus the width of the potato along the direction of movement is only approximately discovered by doubling the distance between the illuminated front edge of the potato and the point of maximum length of the potato, but in many applications such an approximate width is of use. There will be described hereinafter with reference to FIGS. 3 and 4 a method of obtaining more reliable information as to the width and other parameters of the potato along the line of travel).

An alternative method of obtaining the length and width of a potato comprises deriving a timing signal from a toothed wheel mounted on the drive shaft for the roller table. This timing signal can be arranged to indicate the instant at which the centre line of the gap between two rollers passes the scanning path. From the properties of a roller table, it can be assumed that the centre line of each potato lies approximately above the middle of the inter-roller gap, so that the timing signal indicating the centre line of the inter-roller gap indicates approximately which scan of the potato crosses the middle of the potato. The separation of the illuminated edges of the potato at this scan thus indicates a rough measure of the length of the potato (from the properties of a roller table). Furthermore, the linear separation corresponding to the lapse of time between the grazing incidence scan at the leading edge of the potato, and the centre scan indicated by the timing signal, gives a rough measurement of half the width of the potato.

The derivation of information by noting the sharp illuminated boundaries of the illuminated faces of the potatoes gives a high signal-to-background ratio for the signals to be processed by the unit 20. By way of example, the required signals corresponding to the illuminated boundary may be obtained by differentiating a signal (from the camera 18) which represents the intensity of illumination detected by the camera.

The electronic signal processor 20 can be arranged to process the received signals in a number of different ways to supply the following information.

(i) The total number of potatoes passing through the inspection station.

(ii) The rate of flow of potatoes.

(iii) The number of potatoes selected or rejected by the sorting equipment.

(iv) The ratio of selected or rejected potatoes to the total number expressed as a percentage.

(v) The average number of potatoes per row.

(vi) The average length of potatoes in the row or in the crop.

(vii) The identification of any potato in a row expressed as one of a number counting say from one end, (e.g. fourth potato from the left). Such information could be of use to subsequent downstream devices where lateral movement of a potato may have occurred but where the potato has not interchanged its position with any other in the row.

(viii) A width measurement which may be combined with other similar measurements at other angles to provide sufficient information to calculate the approximate volume and maximum width of the potato. (This last measurement will be described in more detail hereinafter with reference to FIGS. 3 and 4).

(ix) A length measurement of the potato for sizing purposes.

A roller table of the kind described is a well-known, simple mechanism for carrying out the following functions in sorting produce such as potatoes:

(i) conveying potatoes horizontally;

(ii) separating potatoes into rows at right angles to the direction of travel;

(iii) aligning each potato such that its longest axis (length) is at right angles to the direction of travel; and (iv) rotating all potatoes on the roller table so that the whole circumference may be observed.

In the equipment shown in the drawings, use is made of only the first three functions of a roller table, and the table is arranged to cease rotating the potatoes before they reach the inspection station.

There will now be described an application of the information derived by examining the potatoes, the information being used in action by operating means positioned downstream of the roller table. In each case the operating devices are known in themselves and will not be described in detail.

An application of the derived information which will be given by way of example consists of sorting potatoes into two groups of different sizes. This is effected by the processing unit 20 deriving information as to the approximate length of each potato detected, deciding whether the potato falls into the 'large' or 'small' category, and associating this grading of the potato with the position of the potato across the roller table. The unit 20 then feeds a plurality of control signals along a plurality of leads indicated as a group by cable 21 to a bank 22 of deflector fingers positioned adjacent the route of the falling potatoes. The deflector fingers 22 are well known in themselves, as is the control logic therefore.

The transverse position of a potato on the roller table will not change substantially during passage, from the point of indication, over the forward discharge end of the table. However, there will be a time delay before it reaches the deflectors and therefore the processing unit 20 includes delay functions to compensate for this time delay.

The information signal (which in this case forms a control signal) from the unit 20 is fed to the finger bank provided at the end of the roller table. The finger bank 22 is known per se for use in, for example, separating clods and stones from potatoes by X-ray pre-cleaners and therefore will not be described in detail. Each finger of the bank is movable independently of the remaining fingers in response to a respective processed signal from the unit 20.

Thus the processing unit 20 is arranged to control the deflector fingers 22 in such a manner that potatoes falling in one size category are allowed to fall past the deflector fingers onto a first receiver, and potatoes falling into a second size category are deflected by raising appropriate deflector fingers to deflect the appropriate potatoes onto a second receiver.

The receivers may take the form of conveyor belts which carry off the potatoes into suitable receptacles located at the side of the roller table. Any given potato reaching the inspection station gives rise to signals in the camera 18 which after processing in the processor 20 will operate the appropriate fingers in time to deflect the selected potato into the appropriate receiver. Clearly it is possible to set up such an arrangement which deflects potatoes variously into more than two different receiving receptacles according to whatever criteria of sorting are in use.

Further information regarding the potatoes approaching the inspection station can be obtained by the provision of further illuminating and camera means provided at another viewing station, conveniently some distance prior to the inspection station referred to above. Such an arrangement is shown in FIG. 4 which shows further linear lamps 27 and 28 arranged above the roller table and backed by further cylindrical mirrors 25 and 26. These are arranged to direct focussed beams down onto the roller table at an angle of say 45° to the surface of the table so as to illuminate bands stretching across the table and thus a row of potatoes if present. Further line cameras 23 and 24 are arranged to view the rows of potatoes thus illuminated along a direction substantially at 80° to the direction of illumination by the lamps 27 and 28. The pictures viewed by the cameras are scanned across the roller table i.e. along the row of potatoes as with the camera 18. This additional viewing apparatus can be used to provide information regarding the widths of the potatoes carried on the roller table. If such further systems are provided two such width measurements can be made and the total girth of the potato estimated from the information thus obtained. For this purpose it is best to arrange that the rows do not rotate over the part of the conveyor (beginning at 12') where these inspections take place. Thus by making the two inspection systems similar but with the lamp and the camera interchanged, two different views of the potatoes can be had and two different width measurements made.

Referring to FIG. 5 there is shown in diagrammatic form the three separate measurements of width which can be approximately determined by the cameras 23 and 24 in FIG. 4. The method of obtaining an approximate width measurement of a potato has been described with reference to FIG. 1, namely determining the illuminated edge of the potato, determining the centre line of the potato, obtaining the separation between these two conditions along the direction of movement of the potatoes, and doubling this distance to give an approximate width of the potato. This method gives the width indicated at $W_3$ in FIG. 5.

When the same method is applied to camera 24 in FIG. 4, the conditions detected are again an illuminated front edge of the potato (indicated by the letter A in FIG. 5) and the point of maximum length of the potato along the rollers (indicated by the letter A' in FIG. 5). Doubling the separation between A and A' gives an approximate indication of the width $W_1$ in FIG. 5, this being detected by processing circuits associated with the camera 24.

In the case of the camera 23 in FIG. 4, the first condition to be detected is the point of maximum length of the potato along the rollers (the point indicated by the letter A in FIG. 5, and determined eg. retrospectively by use of a memory in the processing circuits) and secondly the point of the trailing illuminated edge of the potato (indicated by the letter A' in FIG. 5). The distance between A and A' as detected by the camera 23 gives approximately half the width $W_2$ of the potato shown in FIG. 5. It will be appreciated that combinations of the widths $W_1$, $W_2$ and $W_3$, with the length along the rollers of the potato can be used to calculate the approximate size and shape of a potato.

Other variations can be made in the system according to the invention in accordance with the information it is required to obtain, and according to the objects that are to be dealt with. Although it is convenient to provide a linear source of light and scan along the illuminated row by means of the viewing camera it is also possible to scan the row of objects at the inspection station by providing a flying-spot scanning light source in combination with a wide angle lens camera or both the light source and the camera can be arranged to scan the row in synchronism with one another.

It will be appreciated that the timing of the logic in the processor 20 must be related to the rate of advance of the roller table. However, since the camera can be made to scan the row very rapidly there is no limitation upon the speed at which the system can be run except the capacity of the roller table to handle the object being sorted. Furthermore the total throughput of the system can be increased without increasing the speed of the roller table but merely by increasing the width thereof, the length of the light source and the scanning range of the camera being appropriately augmented. Other variations will be apparent to those skilled in the art.

As has been mentioned, the line scanning camera 18, the elements to conduct the logic functions of the signal processing unit 20, and the deflector devices 22, are all well known in themselves, and will readily be put into effect by those skilled in the art.

By way of example, the line scanning camera 18 may comprise a lens, photodiode or charge-coupled linear array with self-scanning facilities, logic and interface circuitry to provide synchronized clock and "start of scan" signals, and a comparator to compare the output camera signal against a reference for subsequent processing. A camera of this type is manufactured by Integrated Photomatrix Limited, type 4000.

Conveniently the signal processing unit 20 may include a microprocessor such as a MOS 6502 mounted on a printed circuit board such as the Synertek SYM 1.

The micro processor board SYM 1, given as an example, comprises all the necessary elements to function as a microcomputer. A central processing unit, read only memory, random access memory, peripheral interface circuits, and appropriate support circuits are provided.

The method by which such a microcomputer may handle the incoming information from the line scanning camera 18 may be summarised as follows.

The communication between the camera 18 and the microcomputer along the line 19 may comprise three signals; a "start of scan" pulse, a "clock" pulse and a "video data" signal all emanating from the camera. The microcomputer deals with these signals in the following manner to obtain the necessary information from a single scan across the potatoes. First the microcomputer looks for the "start of scan" pulse. Then it samples the "clock" signal until the level changes from a high to a low level. Then it samples the "video data" immediately and stores the resulting high or low level in an area of its memory constituting an "image buffer".

Because the "video data" comes to the microcomputer in serial form and because each negative transition of the "clock" signal coincides with the next element in the serial data, the complete array of elements in the line scanning camera can be regularly examined and loaded into the microcomputer memory ready for subsequent processing.

The microcomputer continuously cycles around each loop awaiting a particular state until a predetermined number of elements has been examined corresponding to the number used in the line scanning camera.

There is provided in the apparatus which has been described so far, a conveyor sensor means which has not been shown in the block circuit diagrams, but which consists of a sensor coupled to the conveyor 12 and arranged to provide a signal related to the movement of the conveyor. By way of example, there is shown in FIG. 6 one form of such a conveyor sensor means which is indicated generally at 45'. Referring to FIG. 6, the rollers of the conveyor 12 are driven by a shaft 30 carrying a sprocket 31. Mounted on the drive shaft 30 are two toothed wheels 32 and 33 which are shown diagrammatically in FIG. 6 as detached from the drive shaft 30. The wheel 32 rotates adjacent a sensor 34, and the wheel 33 rotates adjacent a sensor 35, and in each case the sensors 34 and 35 produce an output timing signal consisting of pulses indicative of the movement of the conveyor 12. These signals are fed along lines 36 and 37 to the signal processing unit 20.

The signals produced by the line scanning camera 18 (for example in FIG. 1) are monitored by the signal processing unit 20 each time a signal is received from the toothed wheel unit mounted on the drive shaft 30 (FIG. 6). A plurality of signals emanate from the toothed wheel unit 45' at regular intervals while each roller is passing through the inspection area. The information from a succession of scans of the camera 18 is accumulated in the memory of the signal processing unit 20.

When the middle of the inter-roller gap passes under the inspection line, a further signal is received by the signal processing unit 20 from the toothed wheel unit 45'. Processing of the stored scans is then carried out and, after an appropriate delay to allow for the produce to fall from the roller table to the deflecting means, signals are sent to appropriate deflecting fingers which are then energised or deenergised to direct the produce according to the predetermined criteria (for example size quality) into a plurality of different paths.

There will now be described a further embodiment of the present invention comprising apparatus for sorting objects in which an operator identifies by visual inspection those objects to be rejected. The combination of such sorting apparatus with apparatus as shown in FIGS. 1 and 2 of this specification will now be described with reference to FIG. 7. Those elements which correspond to elements shown in the preceding figures of the present specification are indicated by the same reference numerals and only additional components of FIG. 7 will be described in detail.

An area of the conveyor belt 12 upstream of the area observed by the camera 18 constitutes an inspection area 4b which is observed by a television camera 30' which views the area 4b by way of a mirror 22'. The television camera 30' feeds a video output to a television monitor screen 25' to be observed by the operator of the sorting machine, the camera 30' and monitor 25' conveniently being constituted by a real time closed circuit television system. As will be explained hereinafter, the operator indicates the position of a selected, "reject", potato on the screen 25' by means of a hand-held probe 27'. Signals from the probe 27' are fed to the signal processing unit 20 which constitutes a control means for the sorting apparatus. Information as to the rate of movement of the conveyor 12 is detected by conveyor sensor means 45' (which may be constituted by toothed wheels such as shown in FIG. 6) and the information is fed to the processing unit 20. Signals from the processing unit 20 are fed along a lne 21 to control appropriate fingers of a finger bank 6', either to direct potatoes on to a conveyor 7' or to allow the potatoes to drop to a reject area (not shown).

It is a feature of the embodiment shown in FIG. 7 for the accepted potatoes to be directed by a gentle rolling motion onto the conveyor 7' while rejected potatoes are allowed to fall to the reject area. This is the opposite arrangement to that adopted in conventional potato sorting machines as it is usual practice for the fingers 6' to be normally in the down position (for the acceptable potatoes which constitute the majority), and to be raised only to reject occasional potatoes. The disadvantage of such a conventional arrangement is that the accepted potatoes tend to receive harsher treatment in falling than do the unwanted reject potatoes.

The probe 27' generates a signal giving information as to the probe position on the screen 25'.

In a preferred form, the probe 27' is actuated or enabled by a switch or trigger 28' at the tip of the probe so that a position-dependent signal is available when the trigger is operated by the operator. The trigger is conveniently a microphone responsive to a light touch of the probe 27' on the screen 25'.

The probe is conveniently constituted by a device known as a light pen which has an optical sensing head which generates a signal from the light on the face of the television screen. This light is generated by the scanning electron beam of the cathode ray tube which is repeatedly scanning across the raster of the tube (line scan) and down the face of the tube (field scan). Hence the moment at which the light pulse is received by the probe relative to the start of each of these scans contains information from which coordinates x and y of its position may be obtained. Thus the signal from the probe 27' is processed in the processing unit 20 to provide in effect the orthogonal x and y coordinates of the point on the inspection area 4b corresponding to the location indicated on the monitor screen 25'. The transverse position of a potato on a full roller table will not change substantially during passage from the point of indication to the forward discharge end of the table. However, there will be a time delay before it reaches the forward end and therefore the signals derived from the probe are processed in the processing unit 20 in dependence upon the translational speed of the roller table (derived from the sensor 45') to compensate for this time delay.

In operation an operator observes the monitor screen 25' and moves the probe 27' to point the probe at a reject potato. When the probe 27' indicates a reject potato the operator actuates trigger 28' thereby causing a position-dependent signal to be made available by the probe.

Thus the signal processing unit 20 derives from the probe 27' information as to the position of a potato to be rejected, and also derives from the line camera 18 information as to the sizes of the potatoes being observed (an appropriate delay being introduced in the signal processing unit 20 to account for the distance between the areas observed by the cameras 18 and 30'). The signal processing unit 20 then relates the dimensional information derived from the line camera 18 with the positional information of a reject potato indicated by the probe 27' and computes which of the fingers 6' need to be lowered in order to create a "hole" in the normally raised bank of fingers 6' so as to allow the reject potato to fall through. It will be appreciated that it is not sufficient to obtain from the signal processing unit the general position of the reject potato as indicated by the probe 27', since it is also necessary to determine from the information provided by the line camera 18, the dimension of the potato along the roller axis, so as to lower the correct number of fingers 6'.

Thus essentially the main sorting system consists of the camera 30', monitor 25', probe 27', and processing unit 20 operated by an operator observing the monitor 25', but has the addition of the line imaging camera 18 to measure the length of the potatoes and also to detect their exact position. The images from the line camera 18 are compared with the information received from the selection system 30', 25', and 27', are associated with the particular row under observation by the line camera 18, and when an object has been selected for rejection, the appropriate number of deflecting fingers are operated corresponding with the length and position of the object.

There will now be described with reference to FIG. 8 an embodiment of the invention which follows generally the schematic diagram shown in FIG. 7, but shows in more detail how the processing unit 20 may be put into effect using a micro computer. The embodiment of FIG. 8 also shows how the inspection area 4b of FIG. 7 can be displayed on a number of television monitor screens 25' with a number of associated probes 27'. The main items shown in FIG. 7 are indicated in FIG. 8 by the same reference numerals. Where a number of elements are repeated due to the presence of more than one display screen 25', the elements are indicated by the appropriate reference numeral followed by a reference letter indicating which of the display screens is associated with that element. The arrangement and operation will be described in detail with reference to only one television monitor 25', the remaining monitors being connected and operating in a similar way.

The main components of the embodiments shown in FIG. 8 comprise the television camera 30' shown previously in the arrangement of FIG. 7, four television monitor screens indicated at 25a', 25b', 25c' and 25d', each having associated therewith a corresponding probe indicated at 27a' to 27d'. Information as to the movement of the roller table conveyor 13 in FIG. 7 is provided from the roller table position sensing unit 45' shown in FIG. 7. The remaining elements shown in FIG. 8 are contained in the processing unit 20 of FIG. 7. The actual deflecting mechanisms 6 of FIG. 7 are omitted from FIG. 8.

Considering in particular the television monitor 25a', the screen scanning is controlled by a synchronizing pulse generator 100 by way of line 101. The video output from the camera 30' is fed to the sync generator 100 along line 102, and the controlling synchronizing pulses are fed to the camera 30' along line 103.

A master address generator 104 comprises a printed circuit board which generates x and y addresses for controlling feeding of information to four probe registers 105a to 105d. The master address generator 104 is linked to the sync generator 100 by five lines 106 to receive line drive and field drive signals and to feed x y display information to the sync generator. The x y information provides on the monitor guide lines for aligning the camera over the inspection area. The master address generator 104 is lined to each of the probe registers 105a to 105d by six line buses 107 and 108 to feed x y addresses to the registers and by a clock pulse line 104'.

The video information is fed from the television camera 30' along the line 102 by way of the sync generator 100 and the line 101' to the monitor 25a', where the selected object is indicated by the probe 27a. The probe 27a' is connected to a band of probe amplifiers 109 by a line 110 along which is passed a video output signal giving information as to the probe position, and an audio signal consisting of an on/off signal from the switching means (28' in FIG. 7) actuated when the probe 27a' is tapped onto the screen. In the example of FIG. 8, the probe 27a' is a light pen and the video signal on the line 110 is essentially a timing signal which is related with the synchronizing information from the sync generator 100 to derive the x y co-ordinates of the probe 27a'. Outputs from the bank of probe amplifiers 109 are fed along lines 111 to respective probe registers 105a to 105d, and the x y positional information is latched into the probe registers 105a to 105d under the control of the x y addresses fed from the generator 104 along the buses 107 and 108.

The control assembly of FIG. 8 includes a micro computer 112 which interrogates the probe registers 105a to 105d along probe address lines 113 and 114 by way of a control decode circuit 115 housed in a probe buffer assembly 116. Information read from the probe registers 105a to 105d is fed to the micro computer along a tri state bus 117 by way of a CMOS-TTL converter 118 situated in the probe buffer assembly 116.

The micro computer 112 also receives information as to the position and movement of the roller table conveyor 13 by way of a machine interface assembly 119 including opto-couplers 120. The table movement information is derived from the roller table position sensing unit 45' which in this case comprises two sensors 121 and 122 which operate respectively from two toothed wheels 123 and 124 rotated on a common shaft driving the roller table conveyor. The toothed wheel 123 has four teeth and the toothed wheel 124 has sixteen teeth. The wheel 123 indicates the position of each roller along the inspection area, and the toothed wheel 124 gives a fine determination of where produce is in the inspection area. The sensors 121 and 122 generate pulses in response to movement of the teeth of the wheels 123 and 124. A further source of information to micro computer 112 is size information relating to rejected articles obtained from line scanning camera 18. This input is shown as input 19' fed to the opto couplers 120 in FIG. 8, and corresponds to the information supplied along line 19 in FIG. 7. The processing of the information at input 19' corresponds generally to the processing of information previously described with reference to FIG. 1, and enables the microprocessor 112 to determine size and exact position of a potato indicated by probe 27' in FIG. 7.

The output of information concerning selected and non-selected articles is fed from the micro computer 112 along data buses 125 and 126 to a series of finger latches 127 which determine whether required fingers are in a deflect or non-deflect position. The outputs 127' of the latches are then fed to a finger buffer circuit 128 before being fed to a bank of fingers 6' which is shown in FIG. 7. The outputs from the finger buffer 128 are fed to actuate the solenoids of the required fingers. The control of routing of information from the micro computer 112 to the latches 127 is controlled by decoding signals fed from the micro computer 112 along lines 130 to a decode finger address unit 131 and a strobe generator 132 in the probe buffer assembly 116. Outputs from these units are fed along lines 133 to the latches 127 to control cycling of the output from the micro computer 112 along the buses 125 and 126 to the required latch addresses.

Two further outputs from each of the probe registers 105a to 105d are made along a bus 134 to the sync generator 100 and along lines 135 to a set of four audio markers 136. The purpose of these outputs from the probe registers is to alert the operator to a completed input of information by actuating the switch on the probe. The indication is made by a visual video signal along the bus 134 which produces a flash on the screen, and by an audio signal which produces a blip at the audio markers 136.

It will be appreciated that by virtue of the way in which all the monitors 25a to 25d are synchronized in their scanning when displaying a picture from the same camera 30, it is possible by extending the number of address latches 127 to add further probes each of which may have a different operator. Any probe may then be used on any monitor screen to indicate the selected or rejected item, or all probes may be used on the same screen.

There will now be described with reference to FIG. 8, the general operation of the control assembly shown, although it is to be appreciated that the operation follows generally the manner previously described with reference to FIGS. 1 and 7. The co-ordinates of the probe positions are obtained as previously described from counters synchronized to the T.V. camera 30' in the address generator 104 and stored in the individual registers 105a to 105d for each of the probes 27a' to 27d'. When any probe indicates a reject article by, for example, tapping the screen of its monitor, the co-ordinates of the probe are latched into the associated probe register in addition to the setting of a flip-flop in the probe register unit to act as a flag indicating that the selection has been made. It is convenient in the embodiment shown to use the micro computer 112 which follows a program of instructions stored in a memory to examine regularly the probe flags and, when one is found "set", to transfer the contents of that probe register to the micro computer memory, and then to reset the flag. This computer 112 also receives pulses from the roller table sensors 121 and 122 and is able in addition to send information to the further sets of latches 127 which drive the selection mechanism consisting of the bank of fingers fed from the output 137.

The stored probe information is updated each time a pulse is received from the roller table sensors 121 and 122, so that as the articles progress those which have been selected are tracked by the computer 112 which may then generate signals to operate the selection fingers at the appropriate time. The micro computer 112 has three main tasks, namely the repeated monitoring of the probe flags, responding to the roller table sensors, and driving the finger control or selection circuits.

In the foregoing description reference has been made to a number of preferred forms of features of the invention for example a roller table form of conveying means and an electronic control means for actuating a deflector means after a delay appropriate to the position of the selected articles at the time of selection. However it is to be appreciated that a wide variety of forms of conveying means and control means may be adopted within the scope of the invention. For example the conveying means may comprise a plain conveyor belt.

The main sorting system consisting of the camera 30', monitor 25', probe 27', and processing unit 20 operates as described above and has the addition of information from the line imaging camera 18 which measures the length of the potatoes and also detects their exact position. The images from the line camera 18 are compared with the information received from the selection system 30', 25', and 27', associated with the particular row under observation by the line camera 18, and when an object has been selected for rejection, the appropriate number of deflecting fingers are operated corresponding with the length and position of the object. The signal processing unit 20 may also allow both functions to operate simultaneously (ie selection, and size grading as has been described with reference to the preceding figures of this specification). Manually set size thresholds can be entered by means of, for example, thumb wheel switches indicated generally at 38 in FIG. 7. Although this Figure shows two numbers of three digits each, it is possible to have as many different size categories as is allowed by the number of fingers in the bank of deflecting fingers 6'.

Another way in which the information derived from the line camera 18 can be utilised by the signal processing unit 20 (in the embodiments of FIGS. 1 and 4 as well as that of FIG. 6), lies in variation of the timing of actuation of the deflecting means to compensate for different instants of toppling of objects over the edge of the conveyor means according to differing sizes of objects. Because of the nature of a roller table conveyor, as the rollers advance around the final drive shaft in a downward direction, potatoes leave the table at different times according to their size and shape. Larger potatoes, those whose dimension in the direction of travel of the conveyor is greater, leave earlier than smaller ones. In order to avoid mistaken deflection due to timing errors, the delay time between observation and operating the appropriate deflecting fingers can be adjusted according to the measurement of the potato taken in the direction of travel, so that the deflecting fingers take up their required positions sooner for larger potatoes. The required derivation of the dimension of the potato along the direction of travel can be obtained as described from the information from camera 18.

I claim:

1. A method of operating on a plurality of objects comprising the steps of:
   supporting the objects on a floor of a conveyor means with a plurality of objects across the width of the conveyor means;
   moving said floor with said objects to carry the objects through an inspection station with a plurality of objects arranged across the width of the conveyor means;
   illuminating a plurality of objects at the inspection station with electromagnetic radiation incident predominantly from a first direction transverse to the width of the conveyor means;
   observing the objects by a radiation detector along a second direction to detect radiation reflected by the objects;
   said direction of said observation being inclined to said direction of said illumination at an angle such that said detector does not observe any portion of said floor which is illuminated by said illuminating means;
   the illuminating and/or detecting steps including a scanning operation across the objects transverse to the direction of movement of the conveyor means to provide from the detector a detection signal representing different reflected radiation from different regions along the path of scanning;

repeating the scanning operation to provide a series of scans across the objects;

processing the detection signal to provide an information signal representative of a dimensional parameter of the size of the objects; and operating upon the objects by action dependent upon the information signal.

2. A method according to claim 1 including observing by the detector an illuminated surface of an object having a boundary presented against a background which is dark relative to the illuminated surface, the said processing step including deriving a signal representative of said illuminated boundary of the object;

the said illuminated boundary extending around a portion of the outer parameter of the object, and the scanning step including scanning across the object along a scanning path such that the radiation detector observes the illuminated boundary on two sides of the illuminated proportion of the object.

3. A method according to claim 2 including carrying out the scanning step in such a manner that the radiation detector obtains information from one scan of an object in which the said illuminated boundary is detected substantially at grazing incidence, and at least one scan in which the illuminated boundary is detected twice.

4. A method according to claim 1 in which the said step of processing the detection signal comprising processing the signal to provide an information signal representative of a maximum linear dimension of an object taken in a direction transverse to the said relative movement between the object and the path of scanning.

5. A method according to claim 1, including the steps of arranging the objects in a plurality of defined, parallel rows, moving the objects one row at a time through an inspection station by movement transverse to the row, illuminating the objects at the inspection station with said electromagnetic radiation incident predominantly from said first direction transverse to the row, said scanning operation being carried out by scanning the objects along said row.

6. A method according to claim 1, including the step of sorting objects by routing different objects in different directions in dependence upon different information signals associated with different objects.

7. A method according to claim 1, in which, in said repeated scanning of said objects, each object is advanced spacially relative to the line of scanning in a direction substantially at right angles to the line of scanning.

8. A method according to claim 1 in which the directions of illumination and observation are inclined to each other an an angle in the range 70° to 110°.

9. A method according to claim 1, in which the said scanning operation is carried out along a direction substantially at right angles to a plane containing the said first and second directions.

10. A method according to claim 1 in which the said step of processing the detection signal comprises processing the signal to provide an information signal representative of a maximum linear dimension of an object.

11. A method according to claim 5 including the step of, aligning the objects in the rows in such a manner that the longest dimension of each object is, in substantially all cases, aligned along the length of the row, and processing the said detection signal to derive an information signal representative of the length of an object along the direction of its row.

12. A method according to claim 1 including the steps of conveying the objects on said conveyor means through said inspection area and subsequently allowing the objects to fall over an end of the conveyor means to routing means for routing objects selectively to different routes in dependence upon at least one sorting characteristic of the objects observed in the inspection area, the timing of actuation of the routing means being varied to compensate for different instants of toppling of objects over the edge of the conveyor means determined by differing sizes of the objects, the timing of the operation of the routing means being dependent inter alia upon an information signal representative of a dimensional parameter of the object, the dimensional parameter consisting of a linear dimension of the object taken along the direction of travel of the conveyor means, and the information signal being provided by said step of processing signal detection signal.

13. A method according to claim 1, in which said angle between said direction of illumination and said direction of observation is in the range 45° to 135°.

14. A method according to claim 1, in which said angle between said direction of illumination and said direction of observation is an acute angle greater than 45°.

15. A method according to claim 1, in which said angle between said direction of illumination and said direction of observation is an acute angle greater than 70°.

16. A method according to claim 1, in which said angle between said direction of illumination and said direction of observation is about 80°.

17. A method according to claim 1, including the steps of:

processing the detection signal from the repeated scans to provide an information signal representative of a linear dimension of an object taken in a direction transverse to the direction of movement of the conveyor means;

moving the objects to a plurality of routing devices positioned in an array transverse relative to the direction of travel of the conveyor means; and operating selected groups of said routing devices to route different objects in different directions, the number of routing devices operated in a group associated with an object to be deflected being determined in dependence upon said information signal representative of said linear dimension of said object transverse to said direction of movement of said objects.

18. A method according to claim 1, including the steps of:

inspecting the objects carried by the conveyor means and generating identifying signals identifying certain objects to be separated from the other objects;

moving the objects to a plurality of routing devices positioned in an array transverse relative to the direction of travel of the conveyor means;

said operating means being arranged to operate a group of routing devices in dependence upon both an identifying signal identifying an object to be separated and upon an information signal representative of a dimension of the object transverse to the direction of travel of the conveyor, said information signal being provided by said processing means, and being utilized to determine the number of routing devices in said group to be operated.

19. A method according to claim 1, in which said step of moving includes aligning said objects with their longest dimension extending in the direction across said conveyor means and said step of processing includes providing an information signal indicating said longest dimension.

20. Apparatus for operating on a plurality of objects comprising:
conveyor means for conveying objects to be operated on through an inspection station, said conveyor means having a floor for supporting a plurality of objects across the width of the conveyor means and for moving with said objects to carry said objects through said inspection station with a plurality of objects disposed across the width of said conveyor means;
means for illuminating the objects at the inspection station with electromagnetic radiation incident predominantly from a first direction transverse to the width of the conveyor means;
a radiation detector for observing the objects along a second direction also transverse to the width of the conveyor means to detect radiation reflected by the objects;
said direction of said observation being inclined to said direction of said illumination at an angle such that said detector does not observe any portion of said floor which is illuminated by said illuminating means;
there being provided in association with either the illuminating means or the radiation detector, or with both, means for effecting a scanning operation across the width of the conveyor to provide from the detector a detection signal representing different reflected radiation from different regions along the path of scanning and for repeating the scanning operation to provide a series of scans across the objects;
means for processing the detection signal to provide an information signal representative of a dimensional parameter of the size of the objects; and
means for operating upon the objects by action dependent upon the information signal.

21. Apparatus according to claim 20 in which
the illuminating means and the detector are arranged in such a manner that there is presented to the detector an illuminated surface of an object having a boundary presented against a background which is dark relative to the illuminated surface, the said processing means being arranged to derive a signal representative of the said illuminated boundary of the object;
the said illuminated boundary extending around a proportion of the outer perimeter of the object, and the means for effecting the scanning operation being arranged to scan across the object in such a manner that the radiation detector observes the illuminated boundary on two sides of the said illuminated portion.

22. Apparatus according to claim 21 in which
the said processing means is arranged to provide an information signal representative of a maximum linear dimension of the object taken in a direction transverse to the said relative movement between the object and the path of scanning.

23. Apparatus according to claim 20 including means for arranging said objects in a plurality of defined, parallel rows and for moving the objects one row at a time through said inspection station by movement transverse to the row, said scanning means being arranged for effecting said scanning operation along the row of objects at said inspection station.

24. Apparatus according to claim 20 in which the said operating means for operating upon the objects subsequent to the examination of the objects comprises routing means for routing different objects in different directions in dependence upon different information signals associated with different objects.

25. Apparatus according to claim 20 in which said conveyor means is arranged to produce movement in a direction substantially at right angles to the direction of scan, the advance of the scans relative to the object being arranged by moving the object or objects through a fixed scan-line along which the scanning takes place.

26. Apparatus according to claim 20 in which the illuminating means and radiation detector are arranged in positions such that the directions of illumination and observation are inclined to each other an an angle in the range 70° to 110°.

27. Apparatus according to claim 20 in which the illuminating means and radiation detector are arranged in positions such that the said scanning operation is carried out along a direction substantially at right angles to a plane containing the said first and second directions.

28. Apparatus according to claim 20 in which the said processing means is arranged to provide an information signal representative of a maximum linear dimension of an object.

29. Apparatus according to claim 23 including the means for arranging the objects in a plurality of defined parallel rows is arranged for aligning the objects in the rows in such a manner that the longest dimension of each object is, in substantially all cases, aligned along the length of the row, and the said processing means is arranged to derive an information signal representative of the length of an object along the direction of its row.

30. Apparatus according to claim 20 in which said conveyor means is arranged for conveying said objects through an inspection area and subsequently allowing the objects to fall over an end of the conveyor means to routing means for routing objects selectively to different routes, and means for actuating the routing means in dependence upon at least one sorting characteristic of the objects observed in the inspection area, the operating means including timing means for varying the timing or actuation of the routing means to compensate for different instants of toppling of objects over the edge of the conveyor means determined by differing sizes of objects, the timing means being connected to operate in dependence inter alia upon an information signal representative of a dimensional parameter of the object, the dimensional parameter consisting of a linear dimension of the object taken along the direction of travel of the conveyor means when the object is on the conveyor means, the information signal being provided by said processing means.

31. Apparatus according to claim 20, in which said angle between said direction of illumination and said direction of observation is in the range 45° to 135°.

32. Apparatus according to claim 20, in which said angle between said direction of illumination and said direction of observation is an acute angle greater than 45°.

33. Apparatus according to claim 20, in which said angle between said direction of illumination and said direction of observation is an acute angle greater than 70°.

34. Apparatus according to claim 20, in which said angle between said direction of illumination and said direction of observation is approximately 80°.

35. Apparatus according to claim 20, in which:
said processing means is arranged to process information from said repeated scans to provide an information signal representative of a linear dimension of an object taken in a directly transverse to the direction of movement of the conveyor means;
said operating means including a plurality of routing devices positioned downstream of said inspection station in an array transverse relative to the direction of travel of the conveyor means; and
said operating means being arranged to route different objects in different directions by operating groups of routing devices, the number of routing devices operated in respect of an object being selected in dependence upon said information signal representative of said linear dimension of the object transverse to the direction of movement of the conveyor means.

36. Apparatus according to claim 20, including:
inspection means for inspecting the objects carried by said conveyor means and for generating identifying signals identifying certain objects to be separated from the other objects;
said operating means including a plurality of routing devices positioned downstream of said inspection station in an array transverse relative to the direction of travel of the conveyor means;
said operating means being arranged to operate a group of routing devices in dependence upon both an identifying signal identifying an object to be separated and upon an information signal representative of a dimension of the object transverse to the direction of travel of the conveyor, said information signal being provided by said processing means, and being utilized to determine the number of routing devices in said group to be operated.

37. Apparatus according to claim 20, in which said conveyor means aligns said objects with their longest dimension extending in the direction across said conveyor means and said processing means provides an information signal indicating said longest dimension.

38. A method of sorting a plurality of objects, comprising the steps of:
arranging the objects on a conveyor means with a plurality of objects across the width of the conveyor means transverse to the direction of movement of the conveyor means;
illuminating the objects with electro-magnetic radiation incident predominantly from a first direction;
observing the objects by a radiation detector along a second direction inclined to the first direction to detect radiation reflected by the objects;
the illuminating and/or detecting steps including a scanning operation across the objects along a path transverse to the two said directions to provide from the detector a detection signal representing different reflected radiation from different regions along the path of scanning;
producing relative movement between the objects and the path of scanning along a direction transverse to the path of scanning and repeating the scanning operation to provide a series of scans across the objects;
processing the detection signal to provide an information signal representatives of a dimensional parameter of the objects;
inspecting the objects and generating identifying signals identifying objects to be rejected;
moving the objects to a plurality of routing devices positioned in an array transverse relative to the direction of travel of the conveyor means;
operating selected groups of the routing devices to allow rejected objects to fall past the operated routing devices to a reject route of travel while acceptable objects are guided by unoperated routing devices to a non-reject route of travel;
the method including the step of operating a group of routing devices in dependence upon both an identifying signal identifying an object to be rejected and an information signal representative of a dimensional parameter of a linear dimension of the object transverse to the direction of travel of the conveyor means, the information signal being provided by said processing step.

39. A method of operating on a plurality of objects comprising the steps of:
arranging the objects on a conveyor means with a plurality of objects across the width of the conveyor means;
moving the objects on the conveyor means through an inspection station;
illuminating a plurality of objects at the inspection station with electromagnetic radiation incident predominantly from a first direction transverse to the width of the conveyor means;
observing an illuminated surface of the object by a radiation detector along a second direction inclined to the first direction to detect radiation reflected by the object, the object having a boundary presented against a background which is dark relative to the illuminated surface, the illuminated boundary extending around a portion of the outer perimeter of the object;
the illuminating and/or detecting steps including a scanning operation across the objects transverse to the direction of movement of the conveyor means to provide from the detector a detection signal representing different reflected radiation from different regions along the path of scanning, the path of scanning being such that the radiation detector observes the illuminated boundary on two sides of the illuminated portion of the object;
repeating the scanning operation to provide a series of scans across the objects;
processing the detection signal to derive an information signal representative of said illuminated boundary of the object including obtaining information from one scan in which the illuminated boundary is detected substantially at grazing incidence, and deriving information as to the separation between a point at which the radiation detector detects an illuminated boundary substantially at grazing incidence, and an approximate center line of the object, to give information as to approximately half the width of the object transverse to the line scan.

40. A method according to claim 39 including the step of arranging the objects in a plurality of defined parallel rows and moving one row at a time into said inspection station in a direction substantially perpendicular to the direction of the row, and the step of locating the approximate centre line of an object by reference to the positioning of the object in one of said plurality of rows, the centre line of the object being regarded as the centre line of the row in which the object is arranged.

41. Apparatus for sorting objects comprising:

conveyor means for conveying objects through an inspection area in an arrangement with a plurality of objects positioned across the width of the conveyor means transverse to the direction of movement of the conveyor means;

selection means for generating identifying signals identifying the objects to be rejected after selection of the objects by an operator inspecting the objects at the inspection area;

means for illuminating the objects with electromagnetic radiation incident predominantly from a first detection;

a radiation detector for observing the objects along a second direction inclined to the first direction to detect radiation reflected by the object;

there being provided in association with either the illuminating means or the radiation detector, or with both, means for effecting a scanning operation across the objects along a path transverse to the two said directions to provide from the detector a detection signal representing different reflected radiation from different regions along the path of scanning;

said conveyor means producing relative movement between the object and the path of scanning along a direction transverse to the path of scanning, and said scanning means being arranged to repeat the scanning operation to provide a series of scans across the object;

means for processing the detection signal to provide an information signal representative of a dimensional parameter of the objects;

a plurality of routing devices positioned downstream of the inspection area in an array transverse relative to the direction of travel of the conveyor means;

means for operating selected groups of the routing devices to allow rejected objects to fall past the operated routing devices to a non-reject route of travel;

the operating means being arranged to operate a group of routing devices in dependence upon both an identifying signal identifying an object to be rejected and an information signal representative of a dimensional parameter of the object, the dimensional parameter consisting of a linear dimension of the object transverse to the direction of travel of the conveyor means, and the information signal being provided by said processing means.

42. Apparatus for operating on a plurality of objects comprising:

conveyor means for conveying the objects through an inspection station in an arrangement with a plurality of objects across the width of the conveyor means;

means for illuminating the objects at the inspection station with electromagnetic radiation incident predominantly from a first direction transverse to the width of the conveyor means;

a radiation detector for observing the objects along a second direction also transverse to the width of the conveyor means and inclined to the first direction to detect radiation reflected by the objects, said illuminating means and detector being arranged so that an illuminating surface of an object is presented to the detector against a background which is dark relative to the illuminated surface, the illuminated boundary extending around a portion of the outer perimeter of the object;

there being provided in association with either the illuminating means or the radiation detector, or with both, means for effecting a scanning operation across the width of the conveyor to provide from the detector a detection signal representing different reflected radiation from different regions along a path of scanning which observes the illuminated boundary on two sides of the illuminated portion, said illuminating means and detector being arranged so that the radiation detector obtains information from one scan in which the illuminated boundary is detected substantially at grazing incidence and for repeating the scanning operation to provide a series of scans across the objects to derive information as to the separation between a point at which the radiation detector detects an illuminated boundary substantially at grazing incidence, and an approximate center line of the object, to give information as to approximately half the width of the object transverse to the line scans;

means for processing the detection signal to derive an information signal representative of said illuminated boundary of the object; and means for operating upon the objects by action dependent upon the information signal.

43. Apparatus according to claim 42 in which the means for producing relative movement between the object and the path of scanning includes means for arranging the objects in a plurality of rows and for moving the objects one row at a time through an inspection station by movement transverse to the row, and there is provided locating means for deriving the approximate centre line of an object by reference to the means for forming the objects into rows.

* * * * *